United States Patent
Lundberg

(10) Patent No.: US 7,126,082 B2
(45) Date of Patent: Oct. 24, 2006

(54) AUTOMATED LASER ENGRAVER

(75) Inventor: John D. Lundberg, Denham Springs, LA (US)

(73) Assignee: Xenetech, Inc., Baton Rouge, LA (US)

( * ) Notice: Subject to any disclaimer, the term of this patent is extended or adjusted under 35 U.S.C. 154(b) by 95 days.

(21) Appl. No.: 10/654,160

(22) Filed: Sep. 3, 2003

(65) Prior Publication Data
US 2004/0040943 A1   Mar. 4, 2004

Related U.S. Application Data

(60) Provisional application No. 60/408,194, filed on Sep. 3, 2002.

(51) Int. Cl.
*B23K 26/02* (2006.01)
(52) U.S. Cl. ............... 219/121.62; 219/121.68; 219/121.83
(58) Field of Classification Search ........... 219/121.62, 219/121.68, 121.78, 121.79, 121.83, 121.69, 219/121.74, 121.82
See application file for complete search history.

(56) References Cited

U.S. PATENT DOCUMENTS

| | | | | |
|---|---|---|---|---|
| 4,223,201 A | * | 9/1980 | Peters et al. | 219/121.63 |
| 4,317,021 A | * | 2/1982 | Walch et al. | 219/121.67 |
| 4,973,819 A | * | 11/1990 | Thatcher | 219/121.78 |
| 5,262,613 A | * | 11/1993 | Norris et al. | 219/121.68 |
| 5,442,154 A | * | 8/1995 | Philippe et al. | 219/121.62 |
| 5,635,086 A | * | 6/1997 | Warren et al. | 219/121.39 |
| 6,528,762 B1 | * | 3/2003 | Mayer | 219/121.83 |

* cited by examiner

*Primary Examiner*—Samuel M. Heinrich
(74) *Attorney, Agent, or Firm*—Ted M. Anthony

(57) ABSTRACT

The invention pertains to a large format, plotter-style automated laser engraver which can be used to engrave various materials. A cabinet body supports a substantially flat work surface which can be raised or lowered as desired. A gantry assembly is mounted in close proximity to such work surface, and facilitates movement of a focused laser assembly to any x/y coordinate along the work surface. A computer controlled wireless focus mechanism is used to regulate the vertical distance between the focused laser assembly and the work surface. Air is provided to cool the work surface during the engraving process.

2 Claims, 9 Drawing Sheets

FIGURE B

AUTOMATED LASER ENGRAVER

CROSS REFERENCES TO RELATED APPLICATIONS

THIS NON-PROVISIONAL APPLICATION CLAIMS THE BENEFIT OF PROVISIONAL PATENT APPLICATION SER. No. 60/408,194, FILED Sep. 3, 2002.

STATEMENTS AS TO RIGHTS TO INVENTIONS MADE UNDER FEDERALLY SPONSORED RESEARCH AND DEVELOPMENT

NONE

BACKGROUND OF THE INVENTION

1. Field of the Invention

The invention relates to a large format, plotter-style automated laser engraver which can be used to engrave various materials. It is an object of the present invention to engrave at high speeds with minimal maintenance requirements and increased engraving productivity.

2. Description of the Prior Art

Prior to the introduction of automated engraving machines, human engravers were required to have particular knowledge of workpiece selection, cutting speeds, and related matters. Engravers were also required to have some level of manual dexterity in order to physically engrave a workpiece. Development of automated engraving machines has resolved a number of these problems and reduces the overall skill level required of an operator.

One common type of automated engraving machine is the laser engraver. Apparatuses utilizing a laser for engraving, or at least writing on, a suitable surface are relatively well known. For example, one such apparatus functions by moving a laser relative to a workpiece which is supported on a work surface and by periodically aiming pulses of collimated coherent light at the workpiece to affect therein an image-wise surface alteration, by a plurality of indentations or pixels selectively placed so that together they form an image. The movement of the laser may be responsive to signals, either directly or by way of a storage, derived from a device which mechanically or optically scans the pattern. The workpiece may consist of any material which is susceptible to the formation of indicia therein as a result of laser beam treatment.

Basically, laser printing or engraving is carried out by aiming a laser beam at a workpiece, the laser beam being switched on at every image point (pixel) or off at every blank position, as the case may be, to form an image in the workpiece. Gray-scale images are typically generated by changes in the intensity of the laser beam by modulating its pulse width. An encoder connected to the drive of the laser tool head provides position signals (pulses per angular unit) to a processor which in turn energizes the laser as a function of the pulses.

Such automated laser engraving machines have greatly improved the overall quality and efficiency of the engraving process. Notwithstanding this fact, existing automated engraving machines still have certain limitations. Generally, such engraving processes are less than ideal because pixels are directionally displaced; that is, such pixels are typically not aligned in precise columns and/or rows. The difficulties inherent in energizing a laser render it difficult to provide high-speed engraving processes of acceptable precision with cost-efficient x-y plotters. For example, current large format laser engraving machines are limited to engraving speeds of under 100 inches per second, require frequent maintenance, and require multiple operation steps to engrave; such limitations reduce productivity and increase operating costs. Furthermore, currently available automatic engraving machines are frequently very large, and unnecessarily complex with respect to the number of parts required.

In light of the foregoing, there is a need for an automated engraving machine that is simple to construct, easy to maintain, and relatively compact in size. The automated laser engraving machine should be able to engrave at high speeds, without requiring frequent maintenance and multiple operation steps.

SUMMARY OF THE INVENTION

The present invention is an engraving apparatus that substantially obviates limitations and disadvantages associated with prior art engraving machines. The advantages and purposes of the invention will be realized and attained by the elements and combinations particularly pointed out in the appended claims.

In the preferred embodiment, the automated laser engraver of the present invention has a substantially flat work surface which is protected by a hinged cover. Said substantially flat work surface effectively defines an x-axis and a y-axis. An automated gantry assembly is mounted in general proximity to said substantially flat work surface. Said gantry assembly comprises first and second elongate rails, oriented parallel to one another, along the y-axis of said work surface. A third rail, oriented perpendicular to said first and second rails along the x-axis of said work surface, is movably mounted to said first and second rails using traveling bracket members. Said third rail can be moved to various positions along said parallel first and second rails and, thus, along the y-axis of the work surface. A carriage assembly, which is movably received on said third rail, can travel along the length of said third rail between said parallel first and second rails.

In the preferred embodiment of the present invention, said traveling bracket members utilize non-recirculating polymer bearings that ride on said first and second rails. Similarly, said carriage assembly also utilizes such non-recirculating polymer bearings that ride on said third rail. Said first, second and third rails are hard coated, anodized rails. Said bearings act to push debris (such as from the engraving process, for example) from said rails, thereby reducing cleaning and maintenance requirements for said gantry assembly. Said non-recirculating polymer bearings riding on said hard coated, anodized rails within the gantry assembly permit the machine to achieve high acceleration and engraving speeds of 120 inches per second and greater with low maintenance requirements.

A first drive mechanism is used to move said first and second traveling brackets (and, accordingly, the third rail) along the length of said first and second rails, respectively. In the preferred embodiment of the present invention, said drive mechanism comprises at least one stepper servo motor and at least one drive belt. Similarly, a second drive mechanism is used to move said carriage assembly along said third rail. In the preferred embodiment, said second drive mechanism comprises at least one stepper servo motor and at least one drive belt. At least one encoder compensates for drive belt flex and maintains the speed of said first and second traveling brackets, as well as said carriage assembly, at desired levels which improves overall quality of the engraving process. Said at least one encoder provides information for motion adjustments and belt flex compensation to the applicable stepper servo motor(s).

A beam from an engraving laser is aimed at a workpiece being engraved using an optical assembly mounted on said carriage assembly. As said carriage assembly moves to desired locations relative to a workpiece being engraved, said laser beam engraves the surface of said workpiece. In the preferred embodiment, optics (mirrors and lens) utilized to aim and focus said laser beam are removable for easy cleaning and can be replaced in position without requiring re-alignment.

Air is conveyed onto the engraving work surface to cool the workpiece and reduce the possibility of fire. In the preferred embodiment, said air flow is supplied through a tube which is mounted at or near said carriage assembly. Air travels through said tube and passes through a plurality of holes along the length of the tube in the general direction of the area where the laser beam strikes the workpiece. Said tube can be rotated to direct such air flow as desired.

In the preferred embodiment, the redirecting and focusing of a laser beam via the gantry assembly and, thus, the engraving on the surface of a workpiece, is controlled via electronics and a computer. A desired design is scanned or otherwise input into the memory of such computer, and this information is supplied to system electronics. Said computer controls aiming of the laser beam relative to said workpiece via the gantry assembly. Said computer also controls laser pulses directed at the workpiece in order to create a surface alteration on the workpiece which is consistent with the desired image.

In the preferred embodiment, a computer touch screen, mounted in a convenient location relative to the laser engraver, permits easy data input for management of engraving job(s). Said touch screen can control functions such as focus point determination, job setup, job positioning, speed adjustments, job performance data and job preview zoom. Said computer touch screen also allows an operator to select engraving specifications directly from a host computer's hard drive and run such jobs on the laser engraving machine. Additionally, in the preferred embodiment, said computer touch screen also allows an operator to determine focus points on a laser table work surface, change operating parameters of the system, position a job on the engraving table work surface and adjust engraving speeds.

A wireless focus mechanism controls the distance, or focal length, between the laser and the workpiece being engraved. In the preferred embodiment, said wireless focus mechanism comprises a diode beam and plunger. Said laser diode beam extends horizontally above the work surface along the length of the x-axis. In the event that the plunger, which is attached to the carriage, touches the workpiece, upward movement of the plunger will cause the diode beam to be broken. When this occurs, the substantially flat work surface is automatically set to a position corresponding to the proper engraving focal length for the object to be engraved.

In the preferred embodiment, the present invention utilizes two primary focus modes: "auto focus" mode and "bull's eye focus" mode. When the auto focus mode is initiated, a location on a workpiece (text character, logo, etc.) is targeted as the initial focus point. When the job is sent to the laser, the focus mechanism plunger will move over the designated x,y coordinate of the initial focus point and the substantially flat work surface of the engraving table will move upward to meet said plunger. Once the plunger is engaged, a diode beam is broken sending a signal to the controller to stop the table's movement. The controller then sends a signal to move the table down reaching the distance of the programmed focal length, thus bringing the object in focus. As soon as the table is focused in this manner, the subject job can begin engraving.

The bull's-eye focus mode allows a user to move a pointer to any point on a workpiece situated on said substantially flat work surface. To set the focus point, a user selects the desired point. In the preferred embodiment, the user will then hear an audible alarm, indicating that the desired point has been set. The auto focus plunger will then move over the selected x,y coordinate point, and the engraving table work surface will move upward to meet the plunger. When the table engages the plunger, a diode beam is broken sending a signal to the controller to stop the table's movement. The controller then sends a signal to move the table down reaching the distance of the programmed focal length, thus brining the point on the plate to be engraved in focus. Thereafter, the engraving process can start.

DETAILED DESCRIPTION OF THE INVENTION

Figure 1:
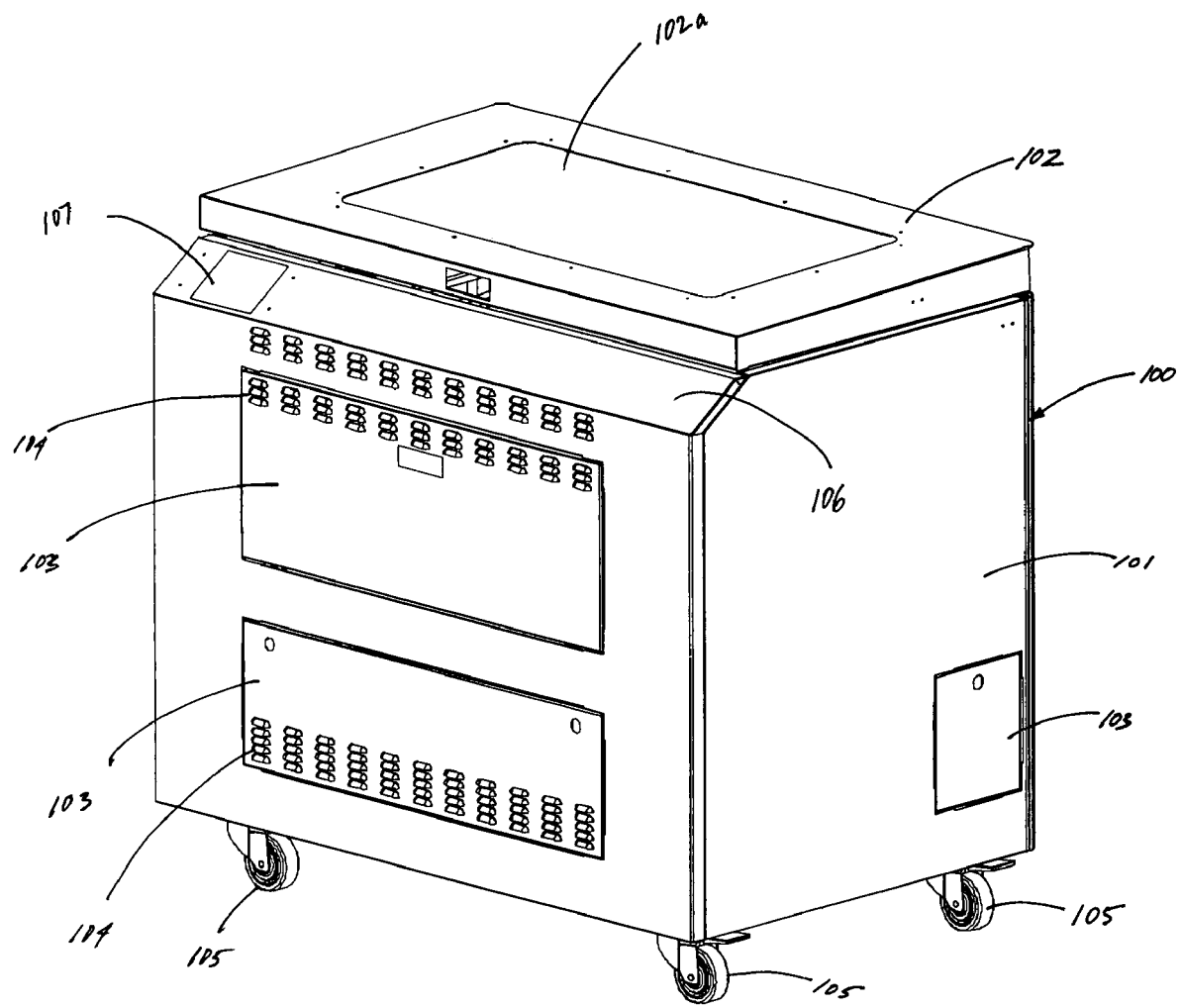
FIG. 1 depicts a side perspective view of the laser engraver of the present invention.

Referring to FIG. 1, the automated laser engraver 100 of the present invention has cabinet body 101 and cover 102. In the preferred embodiment, cover 102 is hinged and can be opened to provide access to engraving table work surface 200 (not shown in FIG. 1), or closed to protect said work surface. Said cover 102 can be supported by gas-charged struts for easy opening and closing of said cover and, in the preferred embodiment, has see-through window 102a included therein. Laser engraver 100 also has removable panels 103 with ventilation ports 104 to permit access to the inside of cabinet body 101. Castors 105 permit laser engraver 100 to be easily moved as desired. Panel face 106 and computer touch screen 107 are presented along the front surface of cabinet body 101 for easy access by an operator.

Figure 2:
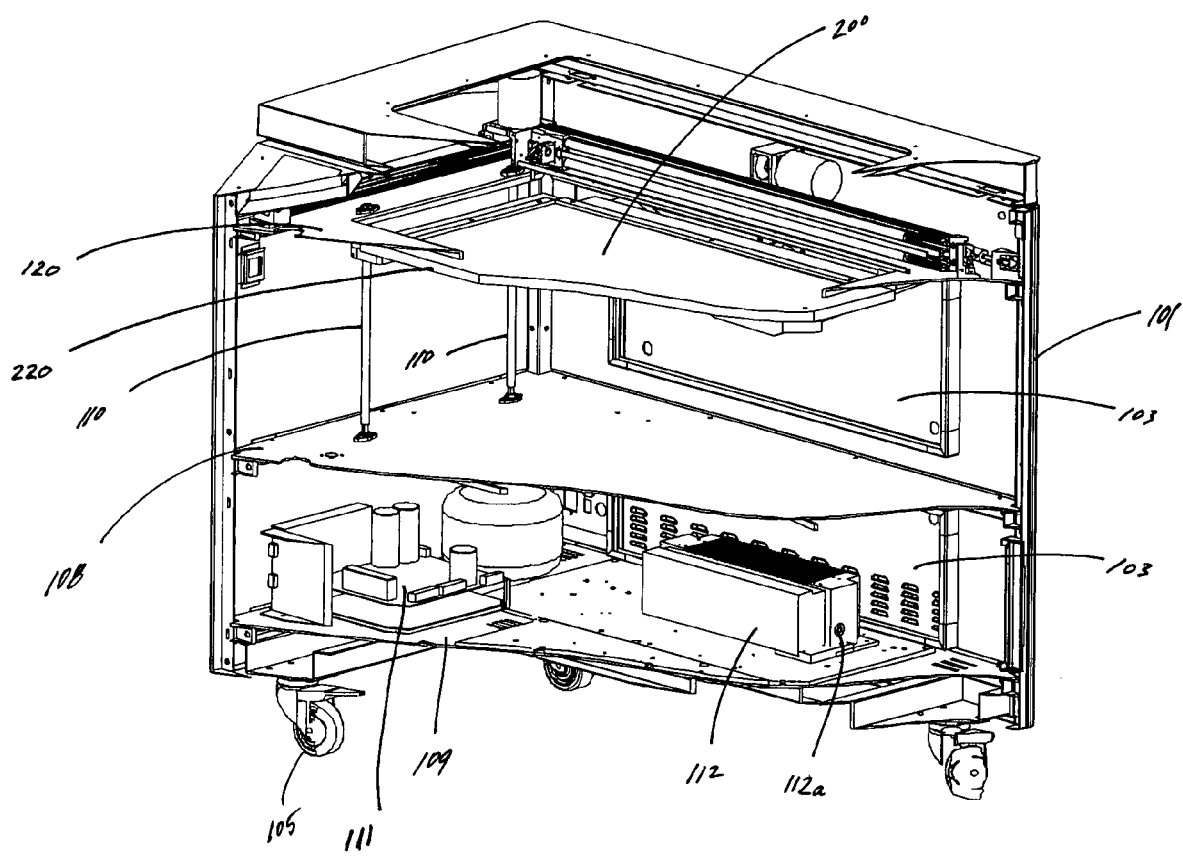
FIG. 2 depicts a side, partial cut-away view of the laser engraver of the present invention.

Referring to FIG. 2, cabinet body 101 defines a support frame for shelves 108 and 109, as well as fixed upper surface 120. Removable panels 103 are also installed along the rear of cabinet body 101 to provide access to the inside of said cabinet body 101 from the rear of laser engraver 100. Substantially planar engraving table 220 having upper work surface 200 is disposed below cover 102. Automated elevation mechanism 110 can be used to raise or lower said engraving table 220, and thus work surface 200, to a desired level within cabinet body 101. Computer unit 111 is situated within cabinet body 101, and is used to control the various functions of laser engraver 100 via electronics. In the preferred embodiment, laser tube 112 is situated on shelf 109 within cabinet body 101. Laser tube 112 emits a laser beam which is used to engrave a workpiece supported on work surface 200.

Figure 3:
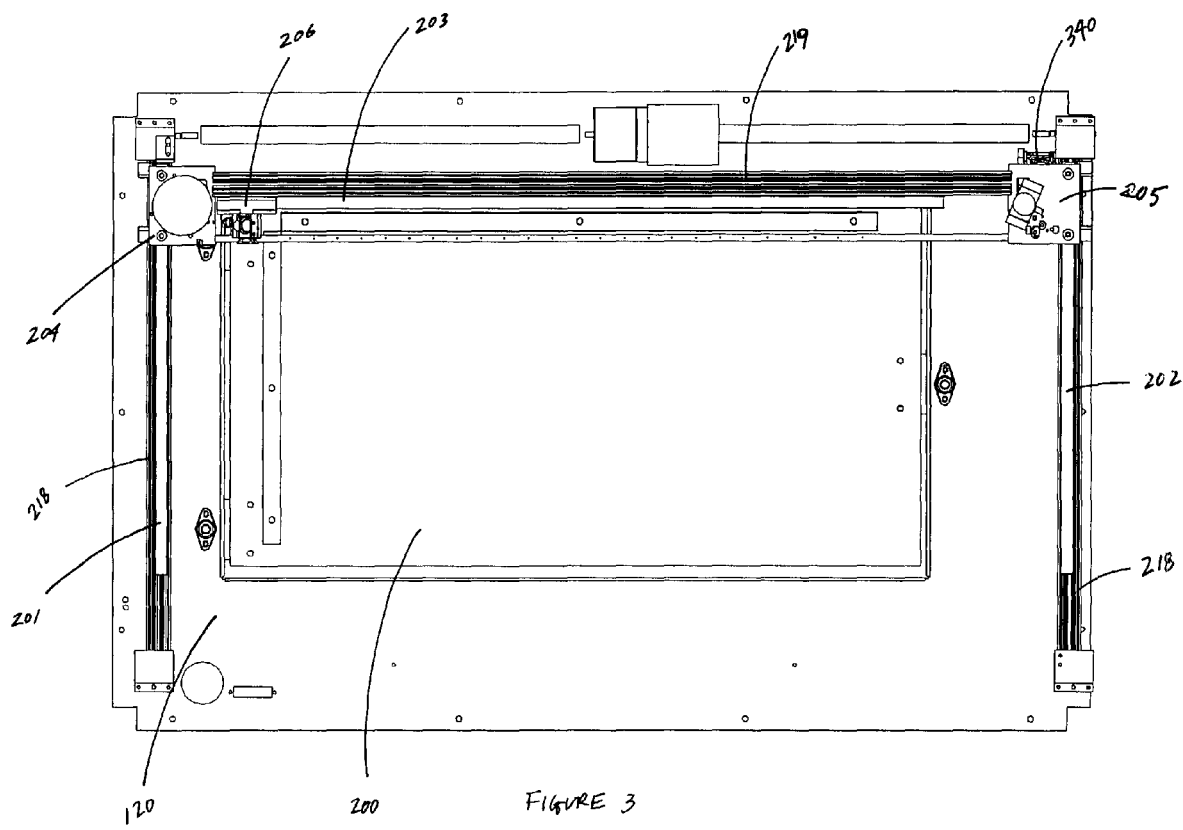
FIG. 3 depicts an overhead view of the work surface and gantry assembly of the present invention.

Referring to FIG. 3, an automated gantry assembly is mounted on fixed upper surface 120 of cabinet body 101. Said gantry assembly is situated in a fixed position in general proximity to movable engraving table 220 and work surface 200. Said gantry assembly comprises first elongate rail member 201 and second elongate rail member 202. First and second elongate rail members are oriented parallel to one another, and together define a y-axis component of work surface 200. Third elongate rail member 203 is oriented perpendicular to said first elongate rail member 201 and second elongate rail member 202, thereby defining an x-axis component of work surface 200. Entire third elongate rail member 203 is movably mounted to said first and second rail members using traveling bracket members 204 and 205. Said third elongate rail member 203 can be moved to various positions along the length of said parallel first and second elongate rail members 201 and 202 and, thus, along the y-axis of work surface 200. Carriage assembly 206, which is slidably disposed on said third elongate rail member 203, can travel along the length of said third elongate rail member 203 between said traveling bracket members 204 and 205.

In the preferred embodiment of the present invention, said first and second elongate rail members 201 and 202 comprise single cylindrical rods. Said third elongate rail member 203 comprises tandem cylindrical rods. Each of said first and second elongate rail members are supported by horizontal support members 218 which are attached to upper surface 120. Third elongate rail member 203 is supported by horizontal support member 219, which is affixed to traveling bracket members 204 and 205. Traveling bracket members 204 and 205 are slidably received on first and second elongate rail members 201 and 202, respectively. In the preferred embodiment, said traveling bracket members 204 and 205 utilize non-recirculating polymer bearings that ride on the external surface of said first and second elongate rail members 201 and 202, respectively.

Carriage assembly 206 is slidably received on third elongate rail member 203. Said carriage assembly 206 also contains non-recirculating polymer bearings that ride on the external surface of said third elongate rail member 203. In the preferred embodiment, first, second and third elongate rail members are constructed of hard coated, dual anodized rails. Said bearings act to push debris (such as from the engraving process, for example) from said elongate rail members, thereby reducing cleaning and maintenance requirements associated with laser engraver 100, generally, and work surface 200, in particular. Said non-recirculating polymer bearings riding on said hard coated, anodized rail members within the gantry assembly of the present invention permit laser engraver 100 to achieve high acceleration and engraving speeds of 120 inches per second and greater with low maintenance requirements.

Figure 4:
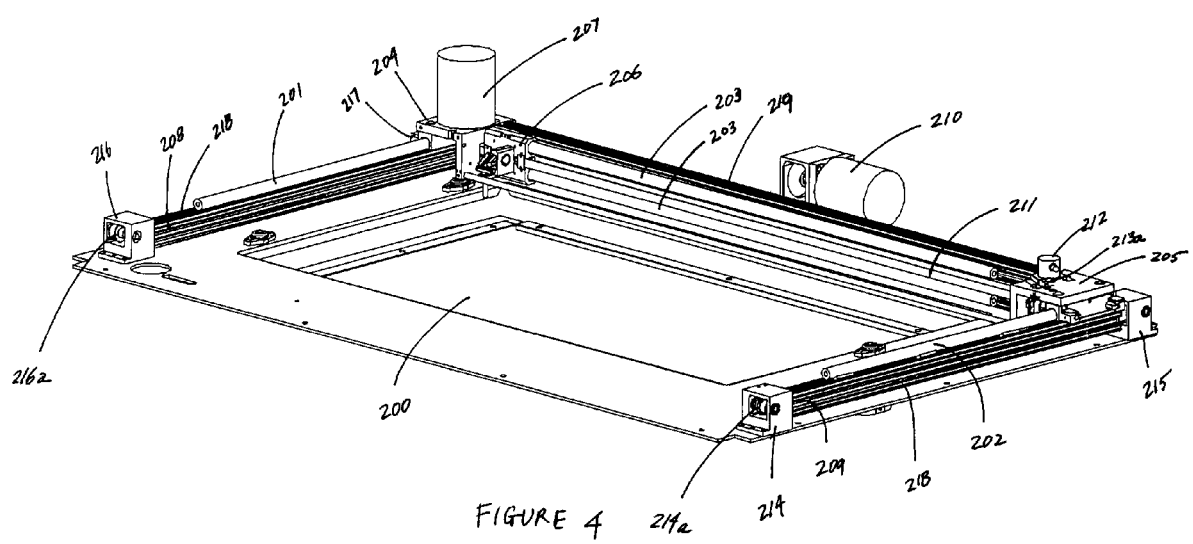
FIG. 4 depicts a side perspective view of the work surface and gantry assembly of the present invention.

Referring to FIG. 4, a first drive mechanism is used to move said first and second traveling brackets 204 and 205 (and, accordingly, entire third elongate rail member 203) along the length of said first and second elongate rail members 201 and 202, respectively. In the preferred embodiment of the present invention, said drive mechanism comprises at least one electric stepper or servo motor 210 and drive belts 208 and 209. Said drive belts 208 and 209 advance along pulleys mounted within hubs 214, 215, 216 and 217 (obscured from view in FIG. 4). In FIG. 4, pulleys 214a and 216a are deployed within hubs 214 and 216, respectively. Although not shown in FIG. 4, similar pulleys are mounted within hubs 215 and 217. Similarly, a second drive mechanism is used to move said carriage assembly 206 substantially along the length of said third elongate rail member 203. In the preferred embodiment, said second drive mechanism comprises at least one stepper or servo motor 207 and at least one drive belt 211. At least one servo motor encoder 212 compensates for drive belt flex and maintains the accuracy of said carriage assembly 206 at desired levels. Said encoder provides information for motion adjustments and belt flex compensation to the applicable stepper or servo motor 207.

Figure 5:
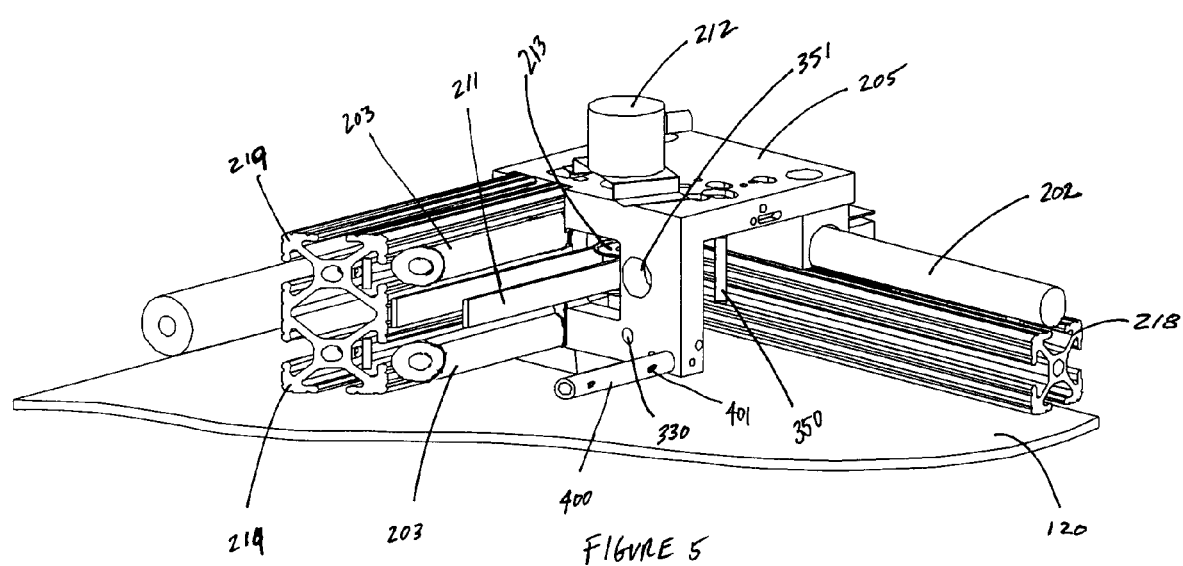
FIG. 5 depicts a detailed side view of a second traveling bracket and encoder of the present invention.

Referring to FIG. 5, horizontal support members 218 are mounted to upper surface 120 of cabinet body 101 and provide support for elongate rail member 202. Traveling bracket 205 is slidably mounted on elongate rail member 202. Encoder 212 is situated on traveling bracket 205 opposite drive motor 207. Due to the high-g acceleration and speed of carriage assembly 206, drive belt 211 could flex and stretch during motion. Encoder 212, attached to shaft 213a of carriage assembly pulley 213, reads directly off of drive belt 211 and compensates for unwanted movement of carriage assembly 206, thereby increasing overall engraving quality.

Figure 6:
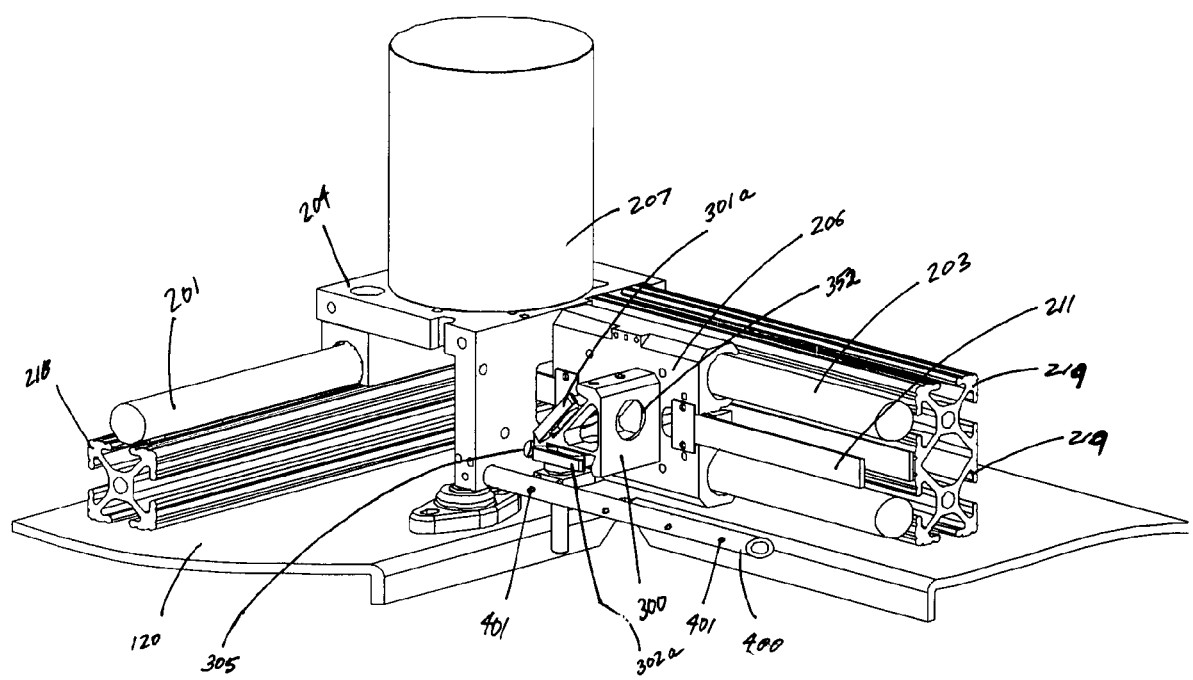
FIG. 6 depicts a side view of a first traveling bracket and carriage assembly of the present invention.

Referring to FIG. 6, horizontal support member 218 is mounted to upper surface 120 of cabinet body 101 and provides support for elongate rail member 201. FIG. 6 depicts a detailed view of traveling bracket 204 and carriage assembly 206. Carriage assembly 206 has a lightweight design, and drive belt 211 is attached to the carriage assembly 206 at the center of moment, thus enabling high-g accelerations. Said drive belt 211 is vertically mounted to said carriage assembly 206, which reduces debris collection on the teeth of said belt. Belt tension is adjustable utilizing a setscrew.

Still referring to FIG. 6, carriage optical assembly 300 is mounted to said carriage assembly 206. As said carriage assembly 206 moves to desired locations relative to work surface 200, and any workpiece situated thereon, said carriage optical assembly 300 directs and focuses a laser beam to engrave the surface of such workpiece. In the preferred embodiment, optics 301 and 302 (a reflector and lens, respectively, obscured from view in FIG. 6) for said carriage optical assembly are removable for easy cleaning and can be snapped back into place without requiring re-alignment. Reflector 301 is mounted within optic casing 301a, while lens 302 is mounted within optic casing 302a.

Figure 7:
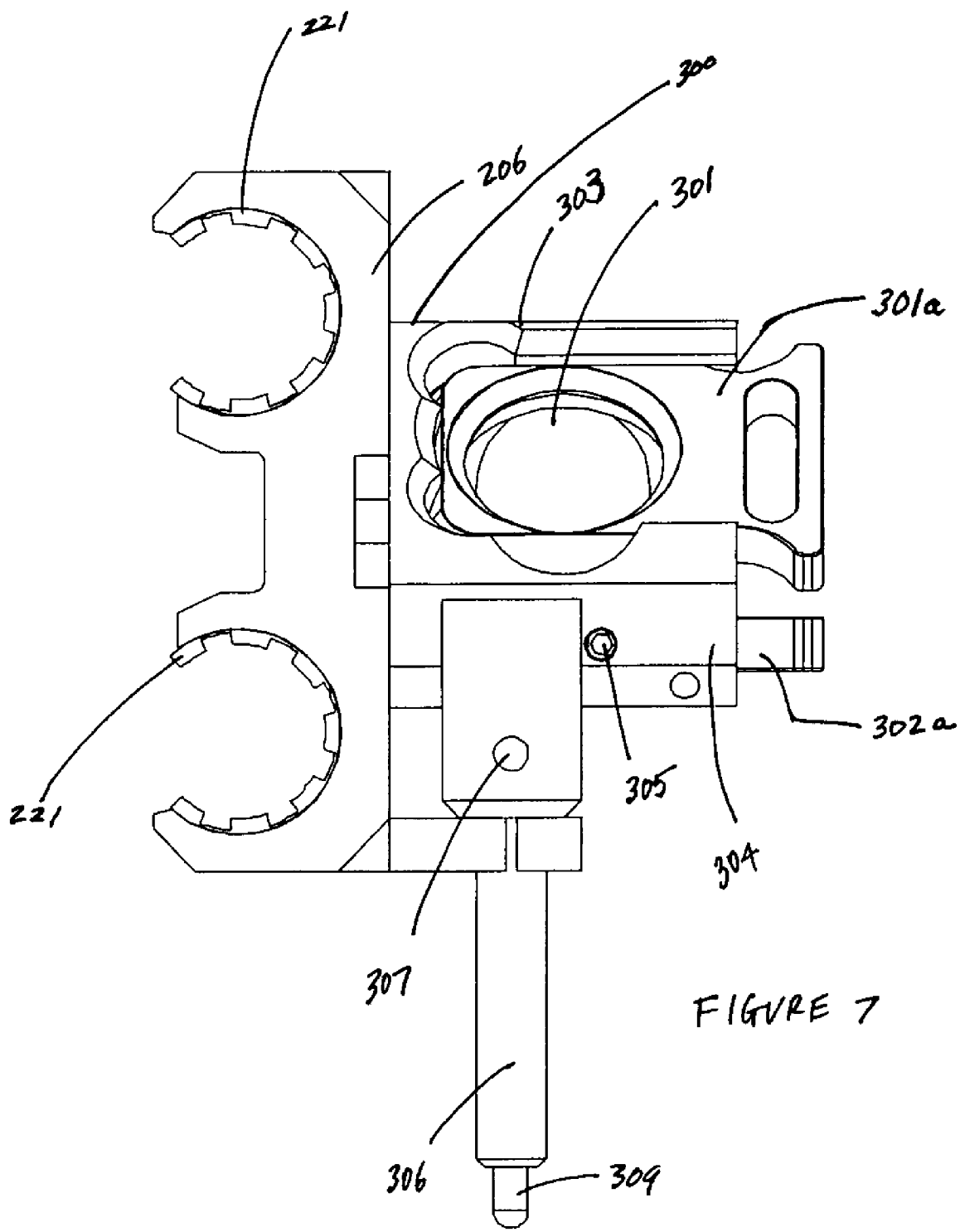
FIG. 7 depicts an end view of a carriage mechanism of the present invention with optical components installed.

FIG. 7 depicts an end view of carriage assembly 206 of the present invention. Referring to FIG. 7, carriage optical assembly 300 is attached to said carriage assembly 206. Bearings 221 are used to slidably mount carriage assembly 206 to third elongate rail member 203. Although not shown in this drawing, such bearings are likewise used to movably mount traveling brackets 204 and 205 to first and second elongate rail members 201 and 202, respectively. Optic casing 301a, and thus reflector 301, is mounted within mounting bracket 303 on carriage optical assembly 300. Similarly, lens casing 302a, and thus lens 302 (obscured from view in FIG. 7) is mounted within mounting bracket 304 of carriage optical assembly 300. Spring loaded, nylon tipped set screw 305 can be employed to firmly hold said reflector casing 301a and lens casing 302a in place within their respective mounting brackets.

Mounting brackets 303 and 304 allow optic placement and removal for cleaning and inspection. When casing 301a and 302a are installed into said mounting brackets, the optics within said casings can be automatically returned to a position that does not require realignment. Said casings 301a and 302a are ideally constructed of aluminum and utilize an anodized color code to instruct proper placement within mounting brackets 303 and 304.

Figure 8:
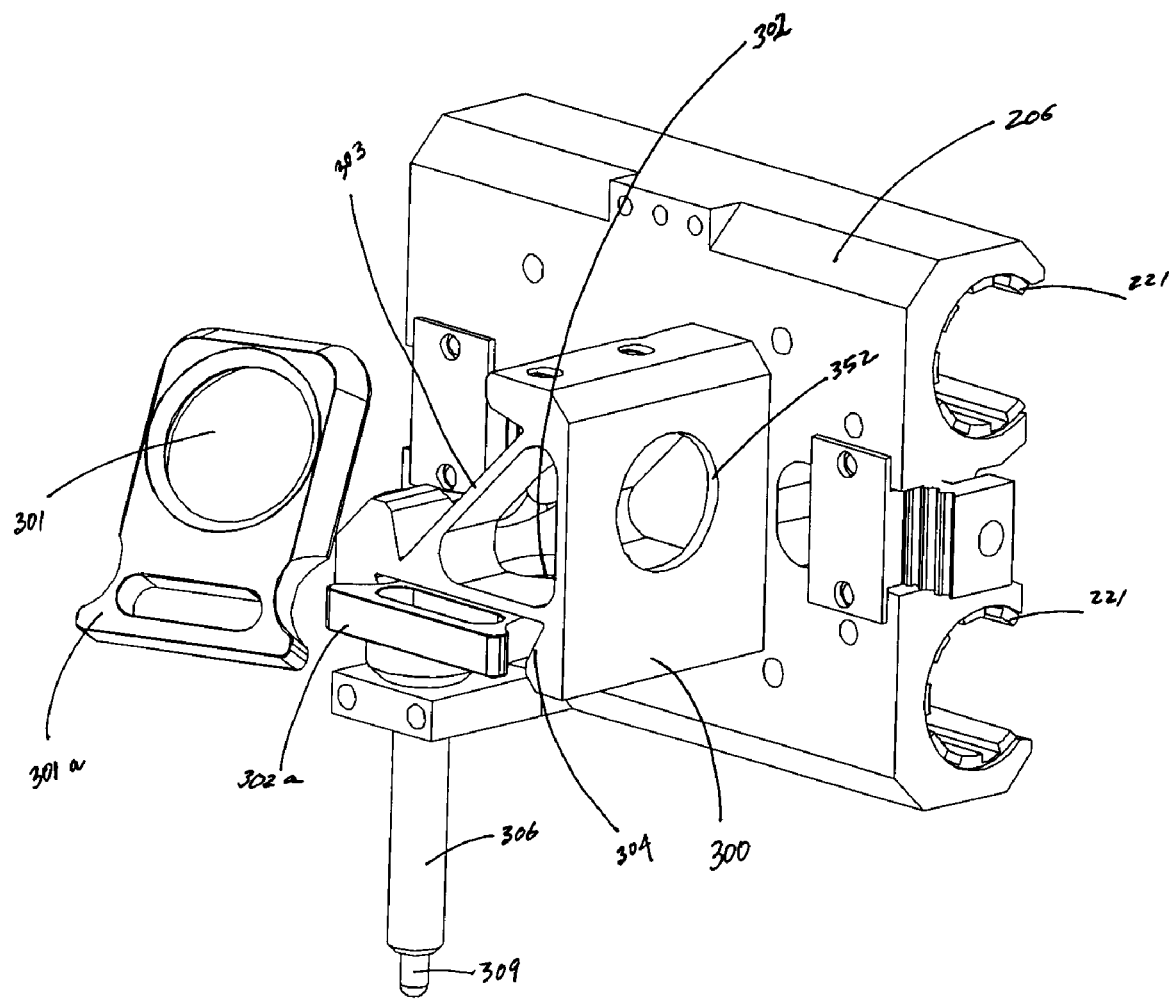
FIG. 8 depicts a side perspective view of a carriage mechanism of the present invention with an optical component removed.

FIG. 8 depicts a side view of carriage assembly 206 and carriage optical assembly 300, with reflector 301 and associated casing 301a, removed. Lens 302, and associated casing 302a, are installed within lens mounting bracket 304. A wireless focus mechanism controls the vertical distance, or focal length, between the carriage optical assembly 300 and a workpiece being engraved on work surface 200 of engraving table 220. In the preferred embodiment, said wireless focus mechanism comprises a diode beam which works in conjunction with plunger 306. A diode laser beam is directed from port 305 on traveling bracket member 204 shown on FIG. 6. Said diode laser beam is directed across work surface 200 along the length of third elongate rail member 203. Said diode beam is focused through a port 307 extending through plunger 306 and towards detector 330 on traveling bracket member 205 (shown on FIG. 5).

Figure 9:
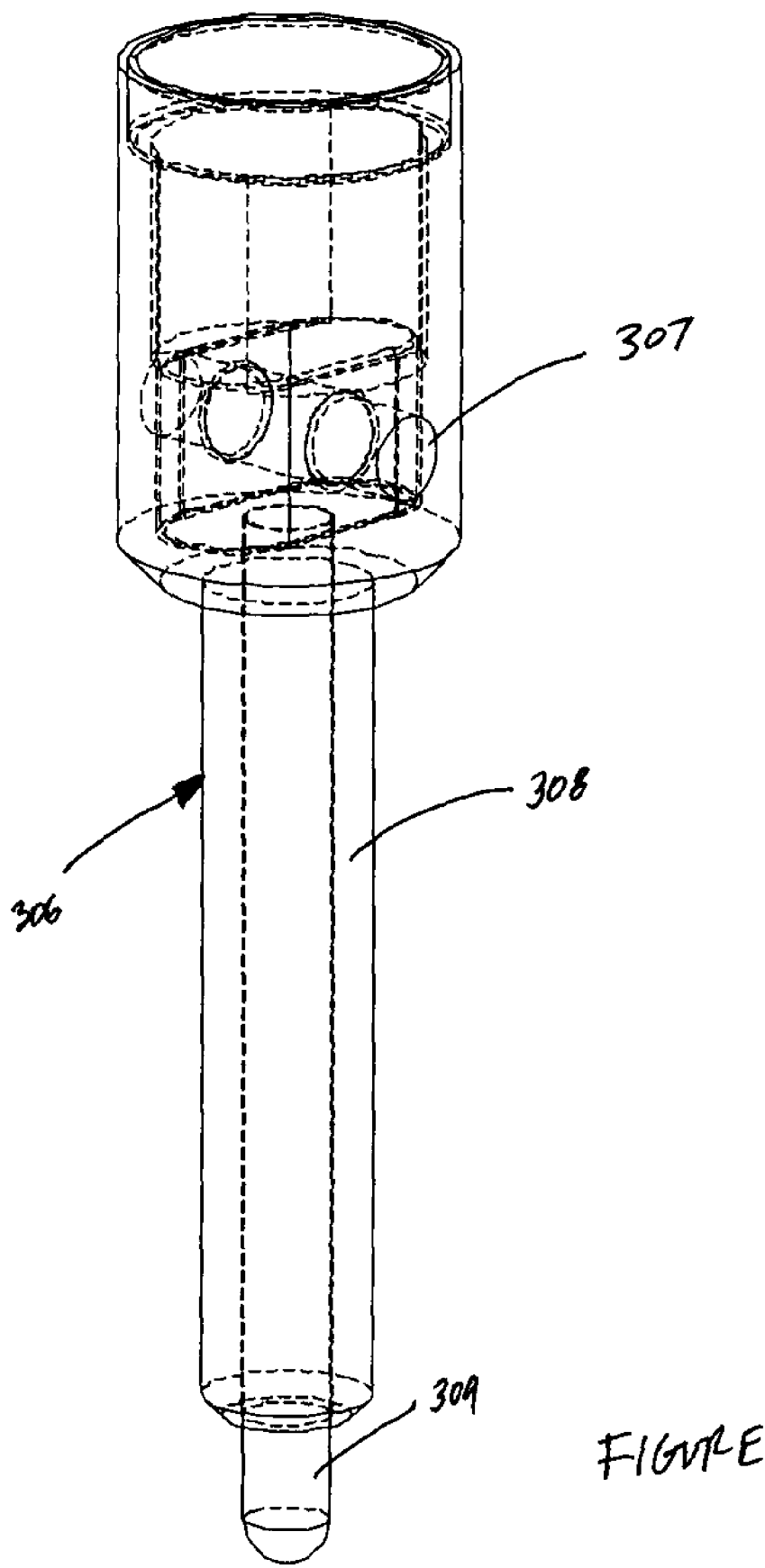
FIG. 9 depicts a detailed view of the plunger of the wireless focus mechanism of the present invention.

FIG. 9 depicts a see-through view of plunger 306 of the wireless focus mechanism of the present invention. Plunger 306 consists of outer body 308, internal shaft 309 and port 307. Although not depicted in FIG. 9, an optional spring can be used to bias internal shaft 309 downward away from port 307. In the event that internal shaft 309 comes in contact with a workpiece situated on work surface 200, internal shaft 309 is directed upward within outer body 308. Internal shaft 309 blocks port 307, thereby interrupting said diode beam and preventing said diode beam from reaching detection sensor 330 on traveling bracket member 205. The computer controller recognizes this as the "pre-set" focus point and automatically adjusts the engraving table 220 and work surface 200 to the correct focal distance relative to carriage optical assembly 300. The process can be directed by an operator through software or through the touch screen keypad.

A laser beam from laser tube 112 is aimed and focused at a workpiece to be engraved on work surface 200 using a series of reflectors and/or lens. Referring to FIG. 2, a beam from laser tube 112 is emitted from port 112a. Said beam is redirected upward toward upper surface 120 using at least one aimed reflector (not shown in FIG. 2). In the preferred embodiment, said beam is thereafter aimed at reflector 340, shown on FIG. 3 which is situated at or near upper surface 120. Said beam is re-directed by reflector 340, and aimed at reflector 350, positioned on traveling bracket 205. Said beam is again reflected using reflector 350, and redirected through port 351 towards carriage optical assembly 300 mounted on carriage 206. Referring to FIG. 6, said beam passes through port 352, towards reflector 301. The beam is reflected by reflector 301 and aimed downward through lens 302 at work surface 200 (and any workpiece situated thereon). As can be seen from the various drawings, in this manner said beam can be re-directed (reflected) and focused as desired at different positions on said work surface 200.

Air is conveyed onto work surface 200 to cool a workpiece being engraved. In the preferred embodiment, said air flow is supplied through a tube which is mounted at or near carriage assembly 206, such as tube 400 on FIGS. 5 and 6. Air travels through said tube and passes through a plurality of holes 401 extending through the tube 400 in the general direction of the area where a focused laser beam strikes the workpiece.

Forced air is used to minimize unwanted flame from engraving certain materials, and pushes debris to a vacuum plenum. In the preferred embodiment, said tube 400 allows for full air flooding onto the material, also helping to cool the engraving material, thereby reducing adverse impact to the material. By rotating the tube, a user can direct the airflow in the desired direction.

In the preferred embodiment, the movement of the carriage via the gantry assembly and, thus, the engraving on the surface of a workpiece, is controlled via electronics and a computer. A desired design is scanned or otherwise input into the memory of such computer, and this information is supplied to system electronics. Said computer controls movement of a laser beam relative to said workpiece via the gantry assembly described herein. Said computer also controls laser pulses directed at the workpiece in order to create a surface alteration on the workpiece which is consistent with the desired image.

In the preferred embodiment, a computer touch screen 107, mounted in a convenient location relative to the laser engraver 100, permits management of an engraving job. Said touch screen can control functions such as focus point determination, job setup, job positioning, speed adjustments, and job performance data. Said computer touch screen allows an operator to select engraving jobs directly from a host computer's hard drive and run such jobs on the laser engraving machine. Additionally, in the preferred embodiment, said computer touch screen also allows an operator to determine focus points on a workpiece situated on work surface 200, change operating parameters of the system, position a workpiece for engraving, and adjust engraving speed.

Referring back to FIG. 1, computer touch control screen 107 is mounted to the front upper panel of the cabinet body 101 and acts as the control interface for the laser engraver of the present invention. Jogging of the gantry assembly, setting home positions, setting job offsets, job preview with zoom, determining focus points, turning on and off air assist, setting blower delay, controlling the audible notifications, turning on the diode laser pointer, toggling between metric and imperial units, using the mottle function, enabling HPGL use, setting the focus offset, accessing test engraving jobs, selecting display languages, pausing, changing power, changing speed, and performing maintenance functions can all be performed by using computer control touch screen 107.

It will be apparent to those skilled in the art that various modifications and variations can be made in the construction of this engraving apparatus without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A laser engraver comprising:
   a. a work surface for supporting a workpiece;
   b. a laser having a beam; and
   c. means for aiming said laser beam at said workpiece comprising a reflector disposed between said laser and said workpiece;

d. means for moving said reflector relative to said workpiece comprising;
   i. a first rail situated along one side of said work surface;
   ii. a second rail situated along the opposite side of said work surface from said first rail, wherein said first and second rails are oriented parallel to one another;
   iii. a third rail, oriented perpendicular to said first and second rails, and slidably mounted to said first and second rails;
   iv. a carriage affixed to said reflector and slidably mounted to said third rail;
   v. means for moving said third rail along said first and second rails; and
   vi. means for moving said carriage along said third rail; and
e. means for maintaining the focus of said laser beam on said workpiece comprising;
   i. a laser diode having a beam situated at one end of said third rail;
   ii. a receptor at the opposite side of said third rail from said laser diode;
   iii. a plunger body having a port between said laser diode and said receptor, wherein said port is aligned with said laser beam;
   iv. a plunger rod slidably received within said plunger body;
   v. a spring biasing said plunger rod away from said port; and
   vi. means for selectively raising and lowering said work surface to a predetermined distance from said reflector when said laser beam is broken.

2. A laser engraver comprising:
a. a cabinet having a top;
b. a work surface along the top of said cabinet;
c. a gantry assembly affixed to the top of said cabinet comprising:
   i. a first rail situated along one side of said work surface;
   ii. a second rail situated along the opposite side of said work surface from said first rail, wherein said first and second rails are oriented parallel to one another;
   iii. a third rail, oriented perpendicular to said first and second rails, and slidably mounted to said first and second rails;
   iv. a carriage slidably mounted to said third rail;
   v. a motorized drive mechanism for moving said third rail along said first and second rails; and
   vi. a motorized drive mechanism for moving said carriage along said third rail;
d. a reflector mounted to said carriage, wherein said reflector is oriented toward said work surface;
e. a laser having a beam, wherein said beam is directed at said reflector;
f. a computer for controlling the position of said reflector relative to said work surface;
g. a laser diode having a beam situated at one end of said third rail;
h. a receptor at the opposite end of said third rail from said laser diode;
i. a plunger body having a port between said laser diode and said receptor, wherein said port is aligned with said laser beam;
j. a plunger rod slidably received within said plunger body;
k. a spring biasing said plunger rod away from said port; and
l. means for selectively raising and lowering said work surface to a predetermined distance from said reflector when said laser beam is broken.

* * * * *